INVENTORS:
WILLARD T. GRUBB,
ROBERT A. MACUR by Paul R. Webb, II

THEIR ATTORNEY

United States Patent Office 3,729,332
Patented Apr. 24, 1973

3,729,332
MICROPOROUS POLYOLEFIN INK-RECEPTIVE PAPER AND METHOD
Willard T. Grubb, Schenectady, N.Y., and Robert A. Macur, Milwaukee, Wis., assignors to General Electric Company
Filed Apr. 6, 1970, Ser. No. 25,702
Int. Cl. D21h 1/10
U.S. Cl. 117—11
6 Claims

ABSTRACT OF THE DISCLOSURE

A microporous polyolefin ink-receptive paper has a composite structure of natural paper and a microporous polyolefin with a porosity of 40 to 90% which composite structure has a diffuse reflectance of at least 90%. Another microporous polyolefin ink-receptive paper has a natural or artificial paper support or backing with a microporous polyolefin coating on at least one major surface which coating has a porosity of 40 to 90% and has a diffuse reflectance of at least 90%. The microporous polyolefin addition to or coating on the paper provides a lightweight ink-receptive surface which optically brightens the paper.

---

This invention relates to microporous polyolefin papers, and more particularly, to such papers which are ink receptive and have a high diffuse reflectance.

While a polyolefin coating on paper would be desirable since such a coating is lightweight and inexpensive, it is not ink receptive. For example, in U.S. Pat. 3,450,557 issued June 17, 1969 it is pointed out that conventional printing inks, whether water base, alcohol base, nitrocellulose base or oil base do not adhere to a polyolefin surface with sufficient strength to prevent destruction of printed matter thereon by normal abrasive forces encountered during handling. Further, it is pointed out that ink applied to a polyolefin surface becomes smeared by rubbing of the printing, or may be lifted from the printed polyolefin surface by contact with the tacky material such as cellophane tape. Various attempted solutions are set forth in this patent for other resultant problems.

Another problem which is encountered in papermaking is to provide a paper which has a high diffuse reflectance. This characteristic of the paper is known as optical brightening of the paper which is frequently accomplished by the coating of or incorporation into the natural paper of various materials such as titanium dioxide and zinc oxide pigments. However, these expensive materials add a substantial weight to the paper to provide the optical brightening.

In our copending application Ser. No. 730,576, filed May 20, 1968, entitled "Microporous Polymer Articles" there is described and claimed a process of producing solid, microporous polymer articles, and the products formed by this process and more particularly to the process of mixing together a solid thermoplastic polymer material selected from the class consisting of polymers of ethylene, polymers of alkyl substituted ethylenes, copolymers thereof, and mixtures thereof, any wax, the weight of the wax employed being greater than 40% and no more than 90% by weight of the total weight of the wax of the polymer material, heating the mixture to an elevated temperature to form a homogeneous solution, cooling the mixture to a solid wax-polymer body, and dissolving the wax from the solid wax-polymer body with a selective solvent forming a brilliant white, microporous polymer article.

The primary object of our invention is to provide an optically bright paper which has an ink-receptive surface.

In accordance with one aspect of our invention, a microporous polyolefin ink-receptive paper comprises a composite structure of natural paper and a microporous polyolefin, the polyolefin having a porosity of 40 to 90% and the polyolefin exhibiting a diffuse reflectance of at least 90%.

Figure 1:
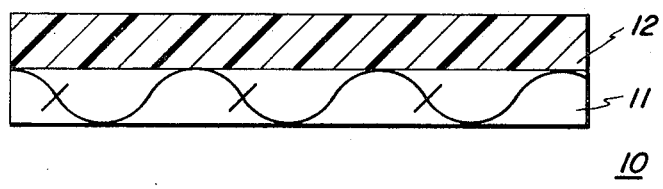
Figure 2:

These and various other objects, features and advantages of the invention will be better understood from the following description taken in connection with the accompanying drawing in which:

FIG. 1 is a sectional view of a microporous polyolefin ink-receptive paper made in accordance with our invention; and FIG. 2 is a sectional view of a modified composite paper made in accordance with our invention.

In FIG. 1, there is shown generally at 10 a microporous polyolefin ink-receptive paper embodying our invention which comprises a natural paper support or backing 11 with a microporous polyolefin coating 12 thereon. Coating 12 has a porosity of 40 to 90% and has a diffuse reflectance of at least 90%.

The microporous polyolefin addition to our natural paper or coating on our natural or artificial paper can be made from solid, thermoplastic materials selected from the class consisting of ethylenes, substituted ethylenes, copolymers and mixtures thereof. Various waxes provide unique media for forming the pores of microporous polyolefin. It will be readily apparent to those skilled in the art that the particular polymer or copolymer chosen must be one which has enough rigidity that the reticulated structure does not collapse due to the resin flowing or contracting after removal of the wax at temperatures below the maximum temperature at which the porous polymer article will be used. In other words, the polymer should not undergo excessive cold-flow in the temperature range of its use as a porous article, should not contract excessively due to plastic or elastic memory after the wax is extracted, and should be one that is capable of forming a self-supporting, reticulated structure.

Waxes are classified as vegetable, animal, petroleum, naturally occurring mineral wax or synthetic wax. Waxes are described in detail for example in the "Encyclopedia of Chemical Technology" which was published by Interscience Publishers, Inc., New York, N.Y., volume 10, 1953, pages 211–228, and volume 15, 1956, pages 1–17.

Natural papers are thin, flexible material in sheets or leaves which are made from rags, wood pulp or other fibrous material and used to write or print on, wrap, decorate, etc. Artificial papers are made from solid thermoplastic polyolefin polymer of the types described above. When only the term "paper" is employed in this application it includes both natural and artificial papers.

In practicing our invention, we mix the solid, thermoplastic polyolefin polymer material and the wax by suitable means, for example, the two may be blended initially together in the dry state but preferably are blended together by heating and mixing at elevated temperatures where the two materials are soluble and form a homogeneous solution. As far as we can determine, all solid, thermoplastic polymers selected from the class consisting of ethylenes, alkyl substituted ethylenes, copolymers and mixtures thereof, form a homogeneous solution at a temperature approximated by the melting point or the softening temperature of the polymer. This mixture is calendered, doctored or solvent cast onto at least one major surface of a sheet of natural or artificial paper stock using a temperature high enough so that the wax and polymer form a homogeneous solution. The coating on the paper is cooled to a temperature where the wax-polymer body is a solid having two intermixed, separate materials. Since the wax is a separate material, it can be dissolved out by a selective solvent leaving the coating as a unitary, microporous solid.

In FIG. 2 of the drawing, there is shown a modified composite paper 15 which has a composite structure 16 of natural paper and a microporous polyolefin with a porosity of 40 to 90%. The composite structure 16 has a diffuse reflectance of at least 90%. In the further practice of our invention, this composite structure is formed by milling a wax polyolefin solid solution into small particles into a natural papermaking slurry. The newly formed composite structure is dried and then heated to the fusion temperature of the wax polyolefin. The composite natural paper is then cooled.

The wax is extracted with a selective solvent, such as n-heptane, in which the wax is soluble but the polymer is insoluble at the temperature used for the extraction. In general, for convenience's sake and ease of further processing, we cool to ambient temperature. The choice of selective solvent is governed chiefly by the type of wax which is employed. The only requirement for the selective solvent to meet is that it dissolve the wax but not the polymer coating at the temperature used for extraction. A hydrocarbon solvent such as n-heptane can be used effectively to dissolve petroleum and mineral waxes. Other wax solvents, which do not dissolve the polymer at the temperature used for extraction, are suitable in our process.

Waxes are suitable in our process to produce the unique results of a microporous polyolefin paper which polyolefin has a porosity of 40% to 90% provided by substantially uniformly distributed continuous and interconnecting pores, and exhibiting a diffuse reflectivity of at least 90%. We found that the microporous polyolefin addition or coating can be obtained with a solid, thermoplastic polymer material selected from the class consisting of ethylenes, substituted ethylenes, copolymers and mixtures thereof, and a wax only when the concentration of the wax is greater than 40% and no more than 90% by weight of the total weight of the wax and the polymer material. We found further that within the above weight range, 50% to 70% of wax produced the most desirable coatings with the best properties. If the amount of wax is substantially less than 40%, it is difficult to extract the wax from the solid wax-polymer coating after it has been incorporated therein by heating. If the amount of wax is substantially greater than 90%, the porous polymer is very fragile. Softness and flexibility are dependent on the polymer material. Because the pores are formed by leaching out the wax phase from the homogeneous mixture, the microporous polyolefin with the continuous pores obtained by our process is unique and entirely different from that obtained by any of the prior art processes.

The microporous polyolefin paper of our invention exhibit a completely unexpected diffuse reflectance of at least 90%. American standard methods of measuring and specifying color are set forth in "American Standard Method of Spectrophotometric Measurement for Color," Z-58.7.1—1951, which was published, for example, in the June 1951, issue of the "Journal of the Optical Society of America" at pages 431–433 thereof. Diffuse reflectance is also discussed in "The Science of Color" by the Commitee on Colorimetry, Optical Society of America, Thomas Y. Crowell Company, New York, N.Y., 1953, at pages 175–178 and 218–219.

Diffuse reflectance is defined in terms of percentage transmission reflectance at a wavelength in millimicrons. As defined above in the "Journal" article, the wavelength range should be from 400 to 700 millimicrons with extensions to shorter and longer wavelengths permissible but not required. The percent transmission reflectance is defined in percentage with the standard of reflectance at 100 percent. In the above "Journal" article under provision 1–2.6.3, the standard of reflection is a freshly deposited layer of smoke from the free burning magnesium metal, of such thickness that no further increase of reflectance can be produced. In measuring the percentage transmission reflectance, which is diffuse reflectance, unidirectional irradiation is required at a degree of 45° normal to the reflectance surface and unidirectional collection of the flux reflected is required in the direction of the normal. Such measurements are defined in both the above "Journal" and the above "The Science of Color" text article. In the text article, there is discussed on page 219, second column, the General Electric type of instrument which is employed in photoelectric spectrophotometers.

With the standard of diffuse reflectance at 100% for magnesium oxide prepared as discussed above, we found unexpectedly that our microporous polyolefin addition or coating exhibited a diffuse reflectance of at least 90% across the entire wavelength range of 380 to 700 millimicrons. Additionally, we found that the diffuse reflectance increased from the 700 millimicron wavelength to the 380 millimicron wavelength. As it will be discussed further in connection with Example 8, we obtained a diffuse reflectance of 98.3% at the 700 millimicron wavelength and 99.4% at the 380 millimicron wavelength.

The microporous polyolefin can be crosslinked by high energy electron irradiation or by chemical agents such as peroxides prior to or subsequent to dissolving the wax therefrom to result in an insoluble, cross-linked structure. The high energy electron irradiation is generally set forth as a total dose which is defined as the total number of roentgen units applied in the irradiation operation. A roentgen unit, as usually defined, is the amount of irradiation that produces an electrostatic unit of charge per cubic centimeter of air under standard temperature and pressure conditions, and as employed here, refers to the amount of electron irradiation measured with an air-equivalent ionization chamber at the position of the surface of the polymer.

While the total dose may be varied, we prefer to employ a total dose in a range from 5 to $95 \times 10^6$ roentgen units at room temperature. A further discussion of high energy electron irradiation and suitable apparatus employed therefor is described, for example, in U.S. Pat. 2,763,609 issued Sept. 18, 1956, and U.S. Pat. 2,858,259 issued Oct. 28, 1959, both of which patents are assigned to the same assignee as the present application.

In order that those skilled in the art may more readily understand our invention, the following examples are given by way of illustration and not by way of limitation. In these examples, the percentages of polymer materials and waxes are set forth as weight percentages. Percent porosity of the microporous polyolefin coating is readily obtained by determining 100 times the difference in weight between the initial solid wax-polymer and the microporous polymer divided by the weight of the initial solid-wax polymer.

EXAMPLES 1–7

In each of Examples 1–7, the solid thermoplastic polymer material was polyethylene of a density of 0.915. The waxes of Examples 1–5 are naturally occurring mineral waxes while the wax of Example 7 is a petroleum wax. Table I sets forth the example number, the wax employed in each example, and the weight percent of wax to the total weight of the polymer material and the wax.

TABLE I

| Example number: | Wax | Weight percent of wax |
|---|---|---|
| 1 | Ceresine | 50 |
| 2 | do | 60 |
| 3 | do | 70 |
| 4 | do | 80 |
| 5 | do | 80 |
| 6 | Ozocerite | 60 |
| 7 | Paraffin | 60 |

In each of these examples, both the polyethylene and the wax were heated together in a beaker to an elevated temperature of about 150° C. to form a homogeneous solution. A wax-polymer coating was formed from the solution by pouring the hot solution onto a glass plate, then pressing a second glass plate on top, and cooling under no added weight. It was easy to separate the plates and remove the uniformly thick sheet or film of material. Each of the wax-polymer bodies in Examples 1, 2, 3, 6 and 7 was 0.020 inch thick, while each of the bodies of Examples 4 and 5 was 0.25 inch thick. Subsequently, a selective hydrocarbon solvent in the form of n-heptane was poured into a container. The wax-polymer coating contacted the n-heptane by being immersed therein. After one hour, the wax was dissolved from the wax-polymer coating of each of Examples 1, 2, 3, 6 and 7 forming a microporous polymer. After 15 hours, the wax was dissolved from the wax-polymer body of each of Examples 4 and 5 forming a microporous polymer. The coating was then removed from the n-heptane. Visual examination showed the coating to have a unique white appearance which when measured exhibited a diffuse reflectivity of at least 90 percent. A microscopic examination showed the above coating to be microporous in nature. The porosity of each coating was then determined to be in excess of 40 percent.

EXAMPLE 8

Fourteen grams of microwax, a petroleum wax of higher molecular weight than paraffin wax, was melted in an oven set to control at 150° C. and 6 grams of polyethylene powder of a density of 0.915 was mixed with the melted wax and heated to form a homogeneous solution. A portion of this wax was poured onto a flat glass plate, allowed to spread to a thickness of about 0.025 inch and then cooled. This layer was carefully stripped from the glass plate with a sharp knife edge, leached at room temperature in normal heptane for several hours, and dried in air for one hour. The resultant sheet was intensely white in appearance, and the upper side was slightly less shiny than the side formerly in contact with the glass plate. The non-shiny side was measured for diffuse reflectivity using a General Electric Recording Spectrophotometer Model No. 7015 E 30 G 1. The diffuse reflectance was 98.3% at 700 millimicrons wavelength and rose uniformly to 99.4% at 380 millimicrons wavelength. The finished thickness of this material was about 0.024 inch, and its porosity was about 65%. The high reflectivity of the material showed the total light both absorbed and transmitted is less than 2% over the visible wavelength region. For this region, the material had an exceptional hiding power.

EXAMPLE 9

A 70/30 weight ratio of paraffin wax and polyethylene was heated to about 140° C. to form a clear, homogeneous solution which was then poured onto a piece of natural filter paper supported on a glass plate. The paper was drained for a few minutes to remove the excess liquid and then cooled. After leaching for one hour in n-heptane and drying in air, the resultant article was a microporous polyethylene paper.

EXAMPLE 10

The paper of Example 9 is employed on one surface of which writing is applied from a pen. The paper exhibited the property of being ink-receptive.

EXAMPLE 11

A 70/30 weight ratio of paraffin and polyethylene is milled into small particles and added to a natural papermaking slurry. Upon formation, the paper is dried in a conventional manner. The paper is heated to a temperature of 140° C., the fusion temperature of the paraffin-polyethylene. After cooling, the composite paper is subjected to leaching for one hour in n-heptane and dried in air. The resulting composite structure consists of natural paper and a microporous polyolefin.

EXAMPLE 12

The composite paper of Example 11 is employed on one surface of which writing is applied from a pen. The paper exhibits the property of being ink-receptive.

EXAMPLE 13

A 70/30 weight ratio of paraffin wax and polyethylene is heated to about 140° C. to form a clear, homogeneous solution which is then poured onto a piece of artificial polyethylene paper. The paper is drained for a few minutes to remove the excess liquid and then cooled. The paper is leached for one hour in n-heptane and dried in air. The resultant article is a microporous polyethylene paper.

EXAMPLE 14

The coated paper of Example 13 is employed on one surface of which writing is applied from a pen. The paper exhibits the property of being ink-receptive.

EXAMPLES 15–18

In each of Examples 15–18 the solid thermoplastic polymer material is polyethylene of a density of 0.915. In each of these examples, 12 grams of the wax is melted in an oven set to control at 140° C. and 8 grams of powdered polyethylene is added with further heating and stirring to form a homogeneous solution. Ozocerite wax, a mineral wax, is employed in Example 15 while white beeswax, a natural wax of animal origin, is employed in Example 16. Palm wax, a natural wax of vegetable origin, is employed in Example 17 while paraffin, a petroleum wax of lower molecular weight than microwax, is employed in Example 18.

A separate piece of natural paper is contacted by each of the above solutions by being immersed therein. Each piece of paper is drained for a few minutes to remove excess liquid and then cooled. After leaching for one hour in n-heptane and drying in air, the resultant article is a microporous polyethylene paper.

EXAMPLE 19

The same method is followed as in Example 15 using 10 grams of paraffin wax and 10 grams of polyethylene powder. This yields a microporous polymer of about 45% porosity. The diffuse reflectivity of this material is 91% at 700 millimicrons wavelength and 94% at 380 millimicrons wavelength.

EXAMPLES 20–21

A 60/40 weight ratio of ceresine wax to polyethylene is heated to 150° C. to form a clear homogeneous solution. A portion of this solution is applied to a major surface of each of two separate pieces of natural paper. After draining and cooling, the first piece of paper is leached in toluene, an aromatic solvent, to form a white microporous polyethylene paper. The second piece of paper is leached in chloroform, a chlorinated solvent, to produce a white microporous polyethylene paper.

EXAMPLE 22

Twelve grams of microwax is melted in an oven set to maintain the temperature at 230° C. and 5.4 grams of 2-methylpentene-1 polymer is mixed with the melted wax to form a homogeneous solution. The solution is applied to a natural paper. After draining and cooling, the paper is leached in n-heptane to form a microporous 2-methylpentene-1 polymer paper.

EXAMPLE 23

Twelve grams of paraffin wax is melted in an oven set to control at 200° C. Four grams of polyethylene and four grams of polypropylene are added to the wax to form a homogeneous solution. The solution is applied to a natural paper. After draining and cooling, the paper is leached in n-heptane at room temperature for one hour to form a microporous polyethylene-polypropylene paper, Obviously, other modifications and variations of the present invention are possible in light of the above teachings. It is therefore to be understood that changes may be made in the particular embodiments of the invention described which are within the full intended scope of the invention as defined by the appended claims.

What we claim as new and desire to secure by Letters Patent of the United States is:

1. A method of making a microporous polyolefin ink-receptive paper which comprises mixing a solid thermoplastic material selected from the class consisting of polymers of ethylene, polymers of alkyl substituted ethylenes, copolymers thereof, and mixtures thereof, and a wax, the weight of the wax being greater than 40% and no more than 90% by weight of the total weight of wax and the polymer material, providing a natural papermaking slurry, milling the mixture into the slurry, forming the slurry into a composite paper, drying the composite paper, heating the paper to a temperature thereby fusing the polymer, cooling the paper thereby forming a solid wax-polymer in the composite paper, and dissolving the wax from the solid wax-polymer thereby providing a porosity of between 40 and 90% and a diffuse reflectance of at least 90%.

2. A method of making a microporous polyolefin ink-receptive paper which comprises mixing a solid thermoplastic material selected from the class consisting of polymers of ethylene, polymers of alkyl substituted ethylenes, copolymers thereof, and mixtures thereof, and a wax, the weight of the wax being greater than 40% and no more than 90% by weight of the total weight of wax and the polymer material, heating the mixture to an elevated temperature to form a homogeneous solution, applying the solution to a natural paper support, cooling the paper thereby forming a solid wax-polymer in the paper, and dissolving the wax from the solid wax-polymer thereby providing a porosity of between 40 and 90% and a diffuse reflectance of at least 90%.

3. A method of making a microporous polyolefin ink-receptive paper which comprises mixing a solid thermoplastic material selected from the class consisting of polymers of ethylene, polymers of alkyl substituted ethylenes, copolymers thereof, and mixtures thereof, and a wax, the weight of the wax being greater than 40% and no more than 90% by weight of the total weight of wax and the polymer material, heating the mixture to an elevated temperature to form a homogeneous solution, applying the solution to at least one major surface of a paper support, cooling the solution thereby forming a solid wax-polymer coating, and dissolving the wax from the solid wax-polymer coating forming a microporous polymer coating with a porosity of between 40 and 90% and a diffuse reflectance of at least 90%.

4. A microporous polyolefin ink-receptive paper produced by the method of claim 1.

5. A microporous polyolefin ink-receptive paper produced by the method of claim 2.

6. A microporous polyolefin ink-receptive paper produced by the method of claim 3.

References Cited

UNITED STATES PATENTS

| | | | |
|---|---|---|---|
| 3,423,491 | 1/1969 | McLain et al. | 264—49 |
| 3,020,597 | 2/1962 | Smith-Johannsen | 18—57 |
| 3,312,648 | 4/1967 | Guttman et al. | 117—158 X |
| 3,376,244 | 4/1968 | Rundle | 260—28.5 |
| 3,329,559 | 7/1967 | Corbin et al. | 162—169 X |
| 2,898,293 | 8/1959 | Capell et al. | 162—172 X |
| 3,269,860 | 8/1966 | Richardson et al. | 162—169 X |
| 3,351,495 | 11/1967 | Larsen et al. | 136—146 |
| 3,375,208 | 3/1968 | Duddy | 260—2.1 |
| 3,236,788 | 2/1966 | Smith-Johannsen | 162—183 X |

RALPH HUSACK, Primary Examiner

M. R. LUSIGNAN, Assistant Examiner

U.S. Cl. X.R.

117—63, 155 UA, 158; 162—169, 172